United States Patent
Hall et al.

(10) Patent No.: US 10,812,016 B2
(45) Date of Patent: *Oct. 20, 2020

(54) ELECTRICAL AND MECHANICAL ROOF UNDERLAYMENT FOR SOLAR SHINGLES WITH AIR GAP

(71) Applicant: HALL LABS LLC, Provo, UT (US)

(72) Inventors: David R. Hall, Provo, UT (US); Seth Myer, Eagle Mountain, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/226,649

(22) Filed: Dec. 20, 2018

(65) Prior Publication Data

US 2020/0204109 A1 Jun. 25, 2020

(51) Int. Cl.
| | | |
|---|---|---|
| *H02S 40/36* | (2014.01) | |
| *H02S 40/32* | (2014.01) | |
| *H02J 50/30* | (2016.01) | |
| *H02S 20/23* | (2014.01) | |
| *H02J 3/38* | (2006.01) | |

(52) U.S. Cl.
CPC .............. *H02S 40/36* (2014.12); *H02J 50/30* (2016.02); *H02S 20/23* (2014.12); *H02S 40/32* (2014.12)

(58) Field of Classification Search
CPC .......... H02S 40/36; H02S 20/23; H02S 40/32; H02J 50/30
USPC ....................................................... 52/173.3
See application file for complete search history.

(56) References Cited

U.S. PATENT DOCUMENTS

| | | | | |
|---|---|---|---|---|
| 2,546,743 A | * | 3/1951 | Harrison | E04D 1/26 219/547 |
| 3,920,518 A | * | 11/1975 | Brissaud | F16J 12/00 376/289 |
| 4,677,248 A | * | 6/1987 | Lacey | F24S 25/61 136/244 |
| 5,053,266 A | * | 10/1991 | Hesketh | E04D 1/30 428/137 |
| 5,522,944 A | * | 6/1996 | Elazari | F24D 11/003 136/248 |
| 5,614,292 A | * | 3/1997 | Saylor | B32B 25/04 428/209 |

(Continued)

FOREIGN PATENT DOCUMENTS

| | | | | |
|---|---|---|---|---|
| JP | 11303346 A | * | 11/1999 | F24S 25/20 |
| JP | 3232201 B2 | * | 11/2001 | H02S 20/25 |

*Primary Examiner* — Brian D Mattei
*Assistant Examiner* — Joseph J. Sadlon

(57) ABSTRACT

Disclosed is a roofing underlayment providing mechanical and electrical connection for solar shingles that includes a water-impervious membrane adapted to be attached to a roof. The underlayment also includes a mechanical attachment member configured to mechanically attach a solar shingle to the roof, as well as an electrical conductor having an electrical first portion of which is embedded within the membrane, having an electrical second portion which is configured to electrically connect to a solar shingle, and having an electrical third portion which is configured to electrically connect to an electrical circuit. An air gap is provided that allows for air flow below the solar shingles. The air gap comprises a space between a bottom surface of the solar shingles and a bottom surface of the membrane.

8 Claims, 15 Drawing Sheets

(56) References Cited

U.S. PATENT DOCUMENTS

| | | | | |
|---|---|---|---|---|
| 5,616,185 A * | 4/1997 | Kukulka | ........... | H01L 31/03528 136/244 |
| 5,813,184 A * | 9/1998 | McKenna | ................ | H05B 3/00 52/518 |
| 6,075,201 A * | 6/2000 | Wambach | ......... | B32B 17/10036 126/569 |
| 6,166,352 A * | 12/2000 | Turton | .................. | E04D 13/103 219/213 |
| 6,201,179 B1 * | 3/2001 | Dalacu | ................ | H01L 31/052 136/244 |
| 6,313,396 B1 * | 11/2001 | Glenn | ................ | H01L 31/042 136/244 |
| 6,489,594 B2 * | 12/2002 | Jones | .................... | E04D 13/103 219/213 |
| 6,633,026 B2 * | 10/2003 | Tuominen | ............... | H02J 7/025 250/205 |
| 6,672,018 B2 * | 1/2004 | Shingleton | ........... | F24S 25/636 52/173.3 |
| 6,936,329 B2 * | 8/2005 | Kiik | .................. | A47G 27/0468 428/141 |
| 7,335,835 B2 * | 2/2008 | Kukulka | ............... | H01L 27/142 136/252 |
| 7,618,310 B2 * | 11/2009 | Daniels | .................... | F24F 7/02 454/366 |
| 7,838,868 B2 * | 11/2010 | Sheats | ................. | H01L 27/3204 257/21 |
| 8,011,140 B2 * | 9/2011 | Durham | ................... | E04H 6/025 135/90 |
| 8,205,400 B2 * | 6/2012 | Allen | ................... | H01L 31/048 136/244 |
| 8,387,319 B1 * | 3/2013 | Gilles-Gagnon | ..... | F24S 25/615 52/173.3 |
| 8,424,256 B2 * | 4/2013 | Cook | ...................... | H02S 20/23 52/173.3 |
| 8,468,754 B2 * | 6/2013 | Railkar | ..................... | E04D 1/26 52/173.3 |
| 8,613,169 B2 * | 12/2013 | Sherman | ................. | H01L 31/05 52/173.3 |
| 8,671,630 B2 * | 3/2014 | Lena | ....................... | H02S 20/25 136/244 |
| 8,742,629 B2 * | 6/2014 | Ichikawa | .................. | H02J 3/32 307/130 |
| 8,776,455 B2 * | 7/2014 | Azoulay | ................. | H02S 20/25 52/173.3 |
| 9,000,714 B2 * | 4/2015 | Mun | ...................... | F24S 25/636 52/173.3 |
| 9,011,221 B2 * | 4/2015 | Daniels | .................... | A62C 3/14 454/366 |
| 9,511,566 B2 * | 12/2016 | Grube | ..................... | B32B 11/10 |
| 9,564,756 B2 * | 2/2017 | Della Sera | ................ | H02J 3/38 |
| 9,634,168 B2 * | 4/2017 | Laia | ........................ | H01L 31/05 |
| 9,640,676 B2 * | 5/2017 | Stone | .................... | H01L 31/048 |
| 9,825,582 B2 * | 11/2017 | Fernandes | ............... | H02S 20/24 136/251 |
| 9,899,955 B2 * | 2/2018 | Tomlinson | ............... | F16J 12/00 376/289 |
| 9,966,898 B1 * | 5/2018 | Flanigan | .................. | H02S 20/25 |
| 10,164,136 B1 * | 12/2018 | Cho | ........................ | H01L 31/046 |
| 10,208,874 B2 * | 2/2019 | Geiger | .................... | H01L 35/30 136/206 |
| 10,425,035 B2 * | 9/2019 | Corneille | .................. | E04D 1/30 428/137 |
| 10,511,253 B1 * | 12/2019 | Britt | .................... | A47G 27/0468 428/141 |
| 10,581,372 B2 * | 3/2020 | Wares | ..................... | E04H 6/025 135/90 |
| 10,587,220 B2 * | 3/2020 | De Vogel | ................ | B32B 11/10 |
| 2005/0161074 A1 * | 7/2005 | Garvison | ............... | H01L 31/048 136/246 |
| 2005/0198917 A1 * | 9/2005 | Hokkirigawa | ........ | C04B 18/101 52/173.1 |
| 2007/0266660 A1 * | 11/2007 | Davies | ...................... | E04D 5/12 52/309.1 |
| 2008/0302409 A1 * | 12/2008 | Bressler | .................. | H02S 20/25 136/251 |
| 2012/0067391 A1 * | 3/2012 | Shiao | ...................... | H01L 35/30 136/206 |
| 2013/0133721 A1 * | 5/2013 | Balyon | .................... | H01L 31/05 136/251 |
| 2014/0090696 A1 * | 4/2014 | Rodrigues | ............... | B32B 25/04 428/209 |
| 2014/0196766 A1 * | 7/2014 | Schumacher | ........... | H02S 20/24 136/251 |
| 2014/0263266 A1 * | 9/2014 | Jenkins | ..................... | E04D 5/12 52/309.1 |

* cited by examiner

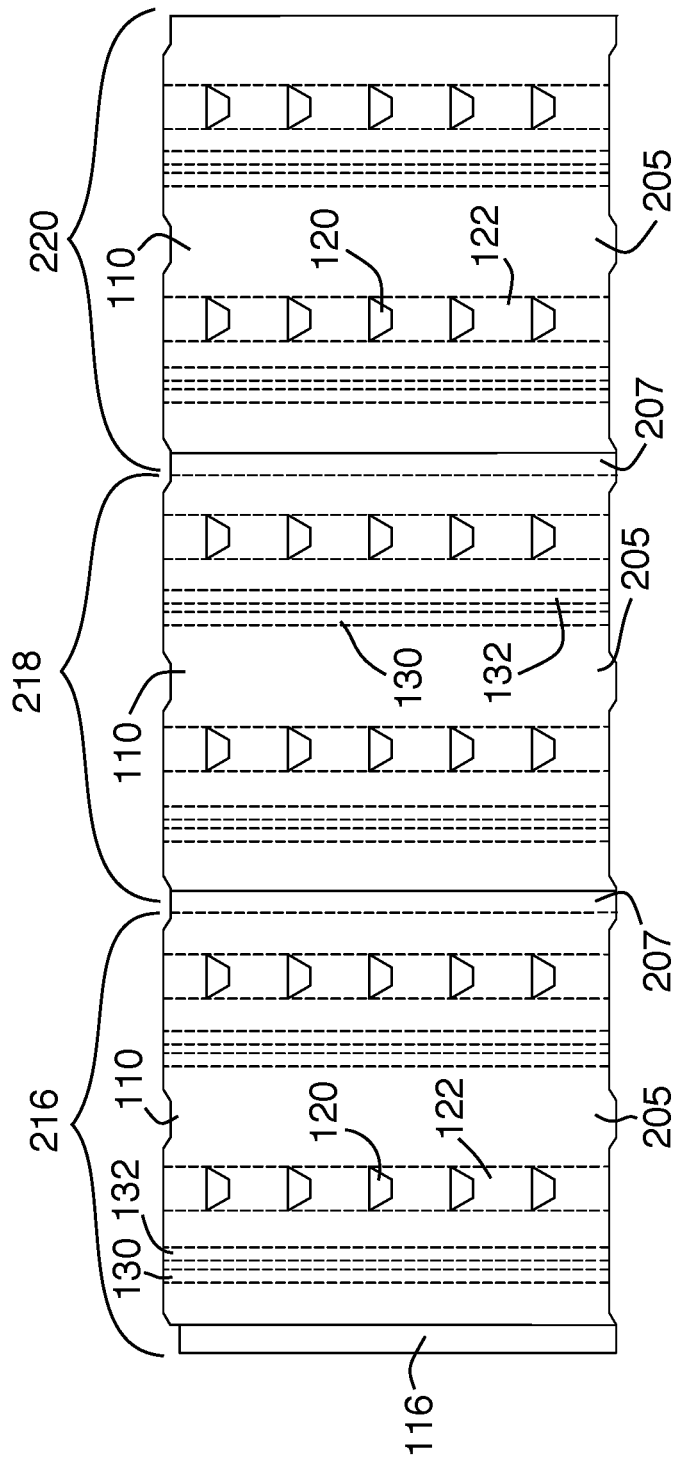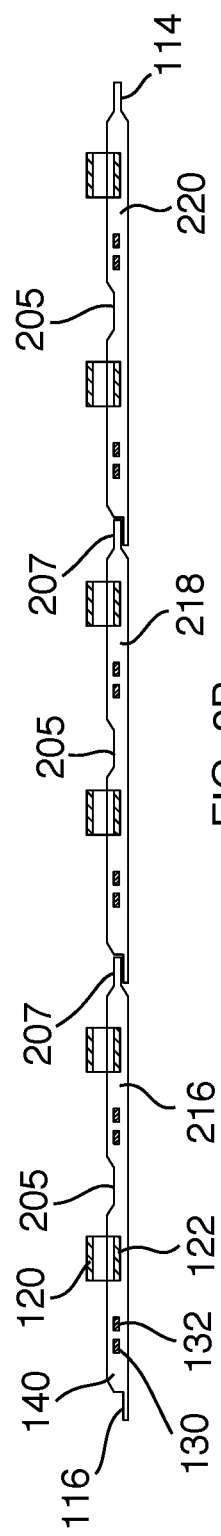

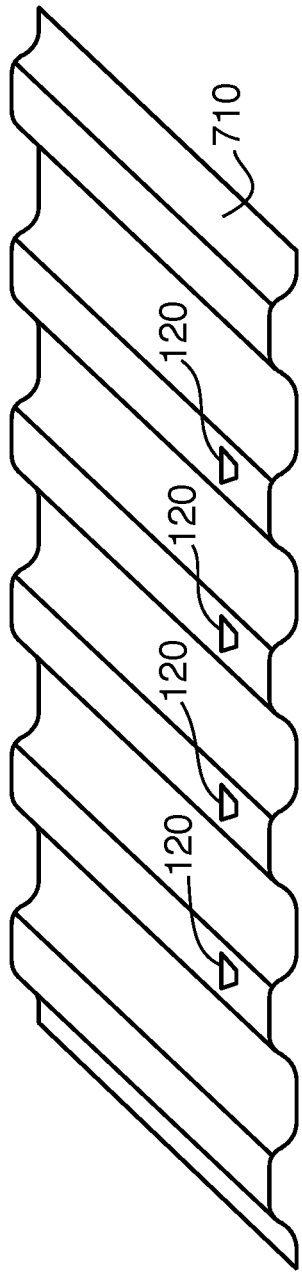
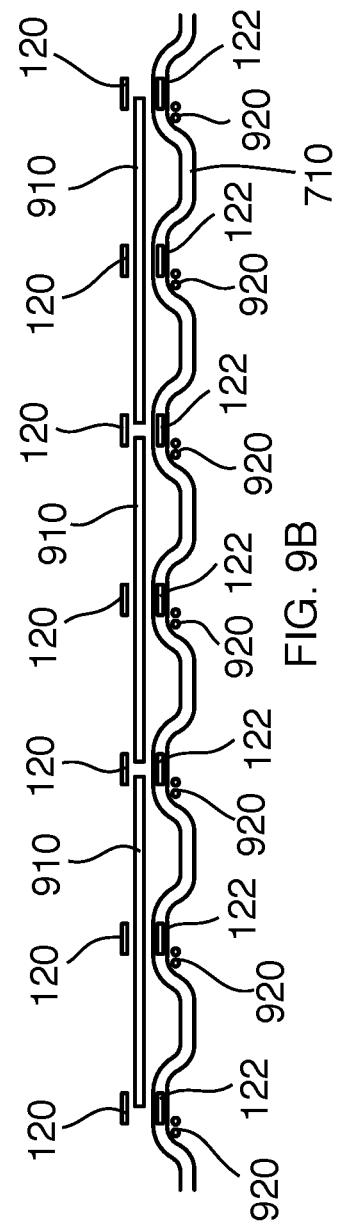
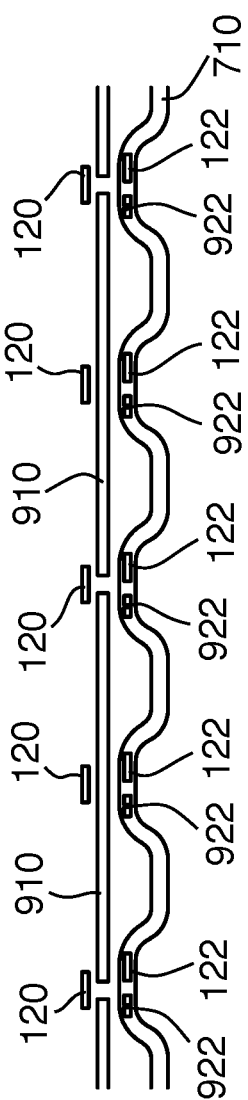
FIG. 9A
FIG. 9B
FIG. 9C

ELECTRICAL AND MECHANICAL ROOF UNDERLAYMENT FOR SOLAR SHINGLES WITH AIR GAP

TECHNICAL FIELD

This invention relates to roof systems with solar shingles.

BACKGROUND

Solar shingles have been available for more than a decade. The installation of most of the solar shingle systems on the market today are very labor intensive. With most systems, it is necessary to first prepare the roof for the installation of the shingles. This may include placing a protective layer or water-resistant material on the roof surface. Structural features may also be installed on the roof in order to mechanically connect the shingles to the roof. These structural features may include some kind of rack or channel that the shingles attach to. These racks or channels must be physically attached to the roof structure. Typically, this requires a penetration through the water-resistant material and roof sheathing with screws or some other attachment mechanism. Every penetration may create a potential for future leaks in the roof.

For traditional solar shingle systems, once the structure is in place to support the shingles, the electrical wiring must be provided to each of the shingles. Typically, each shingle is "daisy-chained" together with adjacent shingles in the same row, connecting a row of shingles in series. At the end of each row there is normally a junction box that combines multiple rows of shingles and runs the combined power of these multiple rows of shingles to an electrical distribution system via an electrical power panel in the house or building.

The connection of shingles to adjacent shingles is normally done by connecting a shingle with an MC4 connector that provides a watertight electrical connection between two adjacent shingles. The row wiring at the end of each row of shingles typically has a junction box that combines multiple row wiring runs together, then has a combined home run back to the service panel.

Each step described in the foregoing requires a significant amount of labor. Therefore, a system is needed to simplify:
1. The preparation of the roof surface to accommodate the installation of the shingles.
2. The installation of the support structure (channels) for the shingles.
3. The mechanical attachment of the shingles to a roof structure.
4. The electrical connection of the shingles to each other.
5. The junction box connection of multiple shingle rows to each other.
6. Installation of the "home run" from the j-box to the service panel.

Many solar roof shingle systems typically consist of a series of solar shingles connected together either in series or in parallel. They are normally connected by wires with male and female connectors on either side of the wiring that connects the shingles. The wiring is either run along the backside of the shingles along a mounting rack, or along the inside of the back frame of the shingle itself. In some cases, the wiring is run inside a wiring chase or raceway behind the shingles.

In some cases, the shingles are applied directly to the roof surface. In other cases, a support structure is attached to the roof that provides a raceway for interconnecting wiring between the shingles. In every case it is necessary to electrically connect each solar shingle to an electrical circuit that distributes the electricity produced by the solar shingles to an electrical circuit.

Alternatively, the connecting wiring for multiple shingles may be integrated within the shingle itself, as described in patent application Ser. No. 15/261,160 submitted 9 Sep. 2016, entitled "Photovoltaic Modular System". When the wiring is integrated or embedded within each of the shingles in the system, there still is the need to connect the wiring from the shingles to the electrical panel or devices being served by the shingles. It is also necessary to structurally attach the shingles to the roof.

For many solar shingles, a junction box or other similar equipment, connectors or parts are required for the connection to the power circuits that extend back to an electrical service panel. The connection to the interconnecting wiring with wire nuts or connectors and installing junction boxes requires a lot of time and labor.

In addition to the electrical connections, there is also needed a system to attach the shingles to a structure such as a roof structure. In some systems, the shingles are attached to the roof with adhesive or otherwise physically attached by nails or screws.

It is known that many solar shingles that are attached directly to the roof surface are not as efficient because of heat buildup. Many of the traditional systems do not provide a pathway for air to be transmitted behind the shingles and out of the top ridgeline of the roof to allow for naturally cooling of the shingles.

SUMMARY

In one aspect, the invention is roofing underlayment providing mechanical and electrical connection for solar shingles that includes a water-impervious membrane adapted to be attached to a roof. The underlayment also includes a mechanical attachment member configured to mechanically attach a solar shingle to the roof, as well as an electrical conductor having an electrical first portion of which is embedded within the membrane, having an electrical second portion which is configured to electrically connect to a solar shingle, and having an electrical third portion which is configured to electrically connect to an electrical circuit. An air gap is provided that allows for air flow below the solar shingles. The air gap comprises a space between a bottom surface of the solar shingles and a bottom surface of the membrane.

In another aspect, the invention is an electrical and mechanical roof underlayment with an air gap which provides electrical and mechanical connection of solar shingles to a roof. An air gap is provided that allows air flow to naturally cool the backside of the shingles to improve energy production. The membrane simplifies the installation of solar shingles allowing the shingles to be installed and connected together in the same step. The membrane has embedded electrical conductors and electrical connectors that provides an electrical connecting system extending to an electrical circuit. The membrane further has embedded mechanical members with mechanical connectors that secure the shingles to the membrane. The membrane is structurally attached to a roof surface. The structural attachment may be an adhesive attachment. Solar shingles are connected to the membrane by an integral clasping mechanism that mechanically and electrically connects the shingles to the membrane. No external wiring, connectors or devices are required to make the electrical connection between the shingles and the membrane. Contacts are integral and embedded into each individual shingle.

In a preferred embodiment, the electrical and mechanical roof underlayment with air gap may provide electrical and mechanical connection of solar shingles to a roof. An air gap space between the solar shingles and the membrane may be provided that allows air flow to naturally cool the backside of the shingles to improve energy production. The membrane may simplify the installation of solar shingles allowing the shingles to be installed and connected together in the same step. The membrane may have embedded electrical conductors and electrical connectors that provide an electrical connecting system extending to an electrical circuit. The membrane may further have embedded mechanical members with mechanical connectors that secure the shingles to the membrane. The membrane may be structurally attached to a roof surface. The structural attachment may be an adhesive attachment. Solar shingles may be connected to the membrane by an integral clasping mechanism that mechanically and electrically connects the shingles to the membrane. No external wiring, connectors or devices may be required to make the electrical connection between the shingles and the membrane. Contacts may be integral and embedded into each individual shingle.

In summary, the key advantages posited for the Electrical and Mechanical Roof Underlayment with Air Gap include a system that:

provides an electrically insulated and environmentally protected pathway from the solar shingles to the electrical devices being served or to an electrical service panel;

provides a protected connection between the shingles and the electrical conductors and wiring connecting the shingles to electrical loads or panel;

provides a mechanical connection of the shingles to the membrane;

provides a structural attachment of the membrane to the roof structure;

allows multiple shingles or rows of interconnected shingles to be connected to this electrical interconnection system;

Provides an air gap between the shingles and the membrane for air flow;

simplifies installation by providing a peel and stick adhesive system that allows the attachment of the membrane to a roof or other building structure; and further simplifies the installation by making the electrical connection of the shingles to the electrical interconnection system by a simple plug-in connection.

Features and advantages of different embodiments of the invention will become more fully apparent from the following description and appended claims or may be learned by practice of the invention as set forth hereinafter.

Consistent with the foregoing, a roofing underlayment with air gap providing mechanical and electrical connection for solar shingles is disclosed. The objectives of the system are to provide an electrical and mechanical roof membrane which provides electrical and mechanical connection of solar shingles to a roof. The membrane has embedded electrical conductors and electrical connectors that provides an electrical connecting system extending to an electrical circuit. The membrane further includes embedded mechanical members with mechanical connectors that secure the shingles to the membrane. The membrane is structurally attached to a roof surface. The structural attachment may be an adhesive attachment. Solar shingles are connected to the membrane by an integral clasping mechanism that mechanically and electrically connects the shingles to the membrane. No external wiring, connectors or devices are required to make the electrical connection between the shingles and the membrane. Contacts are integral and embedded into each individual shingle. Additional objectives include simplifying the installation of solar shingles allowing the shingles to be installed and connected together in the same step.

In a preferred embodiment, a roofing underlayment with air gap providing mechanical and electrical connection for solar shingles may include a water-impervious membrane adapted to be attached to a roof. The membrane may also include a mechanical attachment member having a mechanical first portion embedded within the membrane and having a mechanical second portion extending above the membrane. The mechanical second portion of the mechanical attachment member may be configured to mechanically attach a solar shingle to the roof. The membrane may also include an electrical conductor having an electrical first portion of which is embedded within the membrane, having an electrical second portion which is configured to electrically connect to a solar shingle, and having an electrical third portion which is configured to electrically connect to an electrical circuit. An air gap that allows for air flow below the solar shingles may also be included. The air gap may be an space between a bottom surface of the solar shingles and a bottom surface of the membrane.

In another embodiment, the mechanical attachment member may run substantially the length of the membrane and have multiple portions embedded within the membrane and multiple portions extending above the membrane for attaching multiple solar shingles. The multiple portions extending above the membrane may be mechanically configured for receiving attachment members on multiple solar shingles. The attachment members on the multiple solar shingles may also include electrical connection features.

In an embodiment, the electrical conductor may have multiple electrical portions configured to electrically connect multiple solar shingles.

In one embodiment, the membrane may also include a second mechanical attachment member that runs substantially the length of the membrane and parallel to the mechanical attachment member and at least a second electrical conductor that runs parallel to the electrical conductor.

In a certain embodiment, the mechanical second portion of the mechanical attachment member and the electrical second portion of the electrical conductor may be in proximity and configured so that mechanical attachment and electrical connection of the solar shingle happen simultaneously. In an embodiment, the electrical third portion of the electrical conductor may include an insulated cable with a plug-in electrical connector for connecting to the electrical circuit. The electrical third portion of the electrical conductor may include a second plug-in electrical connector for connecting to the electrical second portion of the electrical conductor.

In an embodiment, the membrane may be adapted to be attached to a roof by adhesive. The adhesive may be a pressure-sensitive adhesive protected by a peelable layer prior to attachment to the roof. In another embodiment, the membrane may also include a raised area for connecting the multiple electrical portions to the multiple solar shingles.

In certain embodiments, a membrane may include a water-impervious membrane adapted to be attached to a roof by adhesive, and may include a mechanical attachment member running substantially the length of the membrane and have multiple alternating embedded portions within the membrane and extending portions extending above the membrane, wherein the extending portions each are mechanically configured for attaching a solar shingle to the roof. The membrane may also include an electrical conductor running substantially the length of the membrane and having at least a first embedded portion embedded within the membrane, having multiple connecting portions extending above the membrane configured to electrically connect to each of the solar shingles, and having a third portion configured to plug in and electrically connect to an electrical circuit. In an embodiment, the connection portions and the electrical extending portions may be positioned and configured so that solar shingles are mechanically attached and electrically connected simultaneously and without creating holes through the membrane. An air gap that allows for air flow below the solar shingles may also be included. The air gap may be a space between a bottom surface of the solar shingles and a bottom surface of the membrane.

In one embodiment, the membrane may include at least a second mechanical attachment member of similar construction and running parallel to the mechanical attachment member and at least a second electrical conductor of similar construction and running parallel to the electrical conductor. The electrical conductor may have multiple electrical portions configured to electrically connect multiple solar shingles. The multiple portions extending above the membrane may be mechanically configured for receiving attachment members on multiple solar shingles. The attachment members on the multiple solar shingles may also include electrical connection features.

In certain embodiments, the mechanical attachment member and the multiple electrical portions of the electrical conductor may be in proximity and configured so that mechanical attachment and electrical connection of the solar shingle happen simultaneously. The membrane may be adapted to be attached to a roof by adhesive. The membrane may further include a raised area for connecting the multiple electrical extending portions to the multiple solar shingles.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 2A is a top view of three membranes connected together.

FIG. 2B is a section view of three membranes connected together.

FIG. 9A is an isometric view of the CAM.

FIG. 9B is a section view of the CAM showing exterior portions along with embedded sections of the structural member.

FIG. 9C is a section view of a second embodiment of the CAM showing exterior portions along with embedded sections of the structural member.

DETAILED DESCRIPTION

Figure 1A:
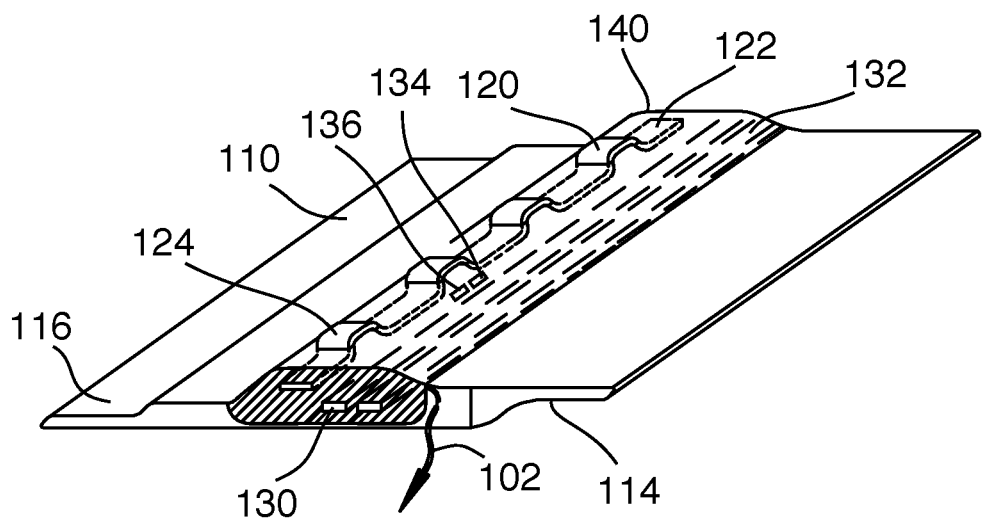
FIG. 1A is an isometric view of the underlayment.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

"Solar shingles" and "shingles" as referred to throughout this document may refer to an electrical module that produces energy, collects energy, produces power, transmits power, conducts electricity, communicates energy, converts energy from one form to another, and combinations of one or more of the foregoing. "Solar Shingles" in a preferred embodiment, also refer to Photovoltaic (PV) electrical modules that collect solar energy from the sun and convert it to electrical energy. In a preferred embodiment, the solar shingles also provide protection from the environment (wind, rain and other wind-blown materials or other elements), in that they act as actual roof shingles.

The six steps listed above for a traditional system are repeated here for reference:
1. The preparation of the roof surface to accommodate the installation of the shingles.
2. The installation of the support structure (channels) for the shingles.
3. The mechanical attachment of the shingles to a roof structure.
4. The electrical connection of the shingles to each other.
5. The junction box connection of multiple shingle rows to each other.
6. Installation of the "home run" from the j-box to the service panel.

The electrical and mechanical roof underlayment with air gap described herein simplifies each one of these steps and provides an efficient method and system for installing solar shingles on a roof. Rather than six steps, there are essentially only three steps involved:
1. Install (peel and stick) the membrane on the roof surface.
2. Install (plug in) the shingles to the membrane.
3. Install the home run to the service panel.

The membrane itself provides a solution to the first four steps listed for the traditional solar shingle systems. The membrane is adhesively attached to the roof and has all of the mechanical and electrical connection features embedded in the membrane. This allows the support structure for the shingles to be easily applied to the surface of the roof without any penetrations, thus eliminating any potential for leaks or water intrusion at the attachment point. The mechanical and structural forces required to attach the shingles to the roof are spread out over a wide area by incorporating the structural and mechanical members inside the membrane itself.

Once the membrane is installed on the roof, each shingle is simply "plugged in" to the mechanical and electrical connections on the membrane. In a preferred embodiment, the connectors the shingle is plugged into have a combined mechanical/electrical connector that make the mechanical and electrical connections to each shingle at the same time in one step. In other words, each shingle is simply plugged in to the membrane and both connections are made simultaneously. This greatly reduces the amount of labor normally needed to make two separate connections. It also eliminates the need for tools to physically attach the shingle to the support structure. The shingle connectors are integrated onto the shingle itself along the edge of the shingle and are combined mechanical/electrical connectors in a preferred embodiment.

The membrane connector is shaped with a large opening at the entrance to the connector to allow the shingle to be slightly misaligned at the point of entry. The opening of the connector narrows and necks down to a narrower opening as the shingle slides into place. This funnel type shape or tapered configuration further simplifies the installation by providing a structure that enables the connection of the connector to handle a typical slightly misaligned entry of the shingle into the connector.

The membrane has an array of connectors configured as needed for the layout of the shingles on the roof. The electrical and mechanical support members are partially embedded inside the membrane, with a portion of the members extending above the top surface of the membrane forming a connector. Each shingle is plugged into at least two of these connectors to attach it to the membrane. Refer to the following figures for a more detailed description of the invention.

Figures

FIG. 1A is an isometric view of the underlayment. The membrane 110 shown in the illustration has a top surface 116 that interfaces with a bottom surface of an adjacent membrane (not shown). The bottom surface 114 of the membrane 110 interfaces with another adjacent membrane (not shown). Thus, multiple membranes may be connected together. In some embodiments multiple membranes are adhesively connected. The tapered interface of surface 116 and surface 114 are thinner than the main body of the membrane allowing the membrane 110 to have the same thickness across the entire area of membrane coverage.

In certain embodiments, membrane 110 further comprises a raised area 140 that includes electrical contacts 134 and 136 on the exterior of the membrane 110 top surface as shown. In the embodiment shown in FIG. 1A, the raised area 140 allows water and other environmental elements such as dust, dirt and debris to be washed away from the electrical contact area and down off of the roof. This allows contacts 134 and 136 to have an exposed contact area flush with the surface of membrane 110, simplifying electrical connections to contacts 134 and 136.

Insulated electrical conductors 130 and 132 may be comprised of one or more of electrically conductive materials including alloys of copper, aluminum, nickel, stainless steel, silver, graphite, tungsten, carbide or combinations thereof. In an embodiment, the conductors may be a busway or bulbar rather than electrical wiring. The conductors 130 and 132 may also be flexible. Electrical wires 102 are connected to conductors 130 and 132 and extend outside of membrane 110 to an electrical circuit. The electrical circuit may be inside a building covered by a roof structure.

Partially embedded structural member 124 as shown in FIG. 1A includes an embedded portion 122 along with an exterior portion 120 that is completely outside of the membrane. In certain embodiments, the exterior portion 120 of the structural member 124 forms a loop that allows the mechanical connection of a shingle to the membrane 110.

Figure 1B:
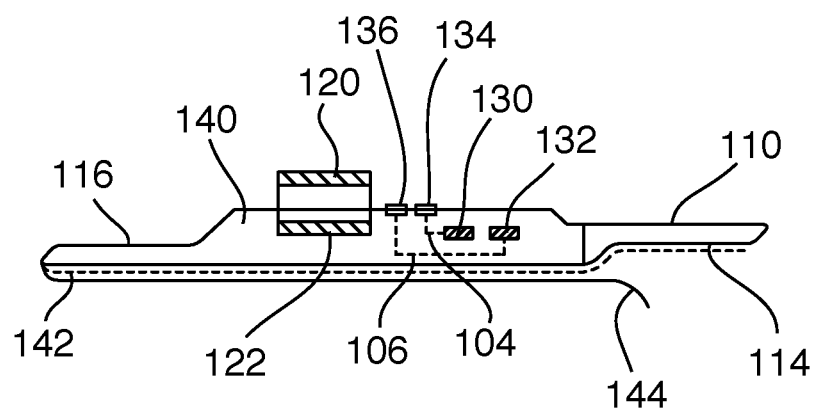
FIG. 1B is a section view from an end view vantage point of a membrane.

FIG. 1B is a section view from an end view vantage point of membrane 110. Tapered top surface 116 and bottom tapered surface 114 are shown. In certain embodiments, both of these surfaces may have adhesive placed on the surface to allow multiple membranes to be adhesively connected together. Adhesive 142 may be placed on the entire bottom surface of membrane 110 and have a protective backing material 144 that is removed at a time of installation, exposing the adhesive 142. In other embodiments the adhesive 142 may cover portions of one or more surfaces of the membrane 110.

In the embodiment shown, raised area 140 may include both electrical contacts 134 and 136 along with structural embedded portion 122. In other embodiments the raised area 140 may include only electrical contacts 134 and 136 and the embedded portion may be at a lower level not included in the raised area. Exterior portion 120 of the structural member is also shown in this embodiment. Electrical conductors 104 and 106 are shown connecting insulated electrical conductors 130 and 132 to electrical contacts 134 and 136.

Figure 1C:
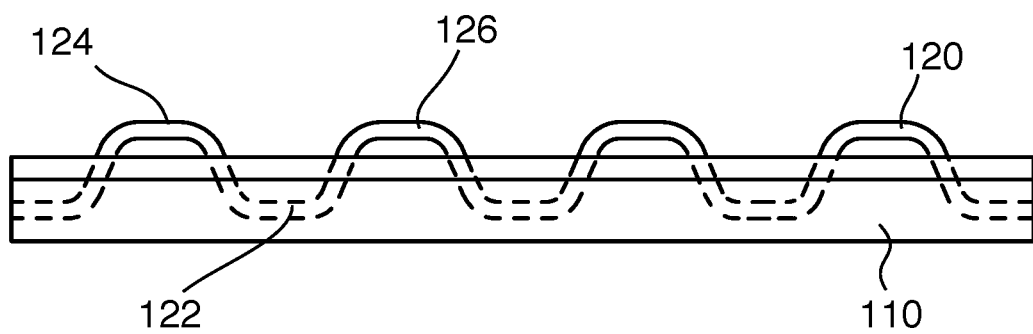
FIG. 1C is a section view from a side view vantage point of a membrane.

FIG. 1C is a section view from a side view vantage point of membrane 110. This embodiment illustrates how partially embedded structural member 124 forms a loop 126 on the exterior portion 120 of the structural member 124. Structural embedded portion 122 is also shown completely embedded inside the membrane 110.

Figure 1D:
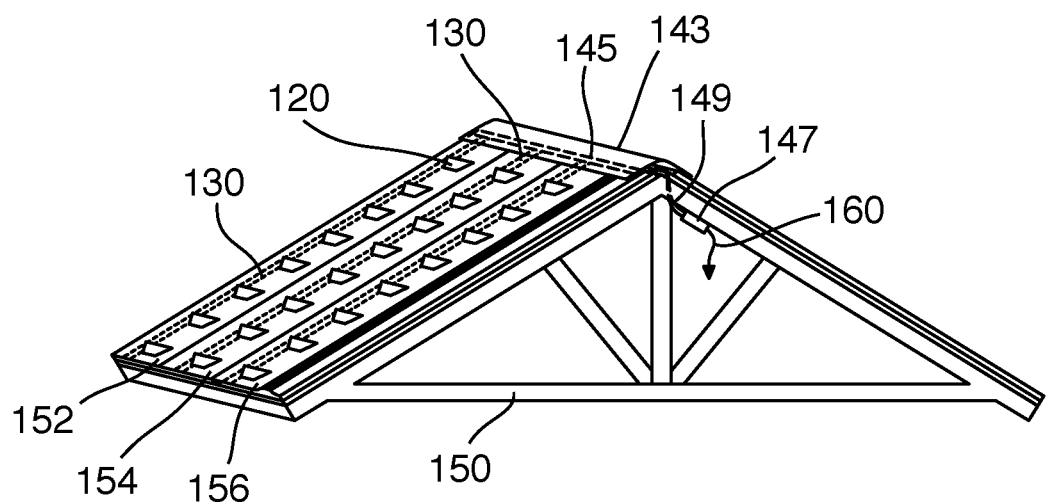
FIG. 1D is an isometric view of a roof with vertical membranes installed on the surface of a roof.

FIG. 1D is an isometric view of a roof with vertical membranes installed on the surface of roof 150. Three membranes 152, 154 and 156 are installed on the roof 150 surface as shown. In this embodiment, each of the three membranes 152, 154 and 156 are placed on roof 150 running from top ridge 143 and extending down to a bottom edge near the soffit, rain gutter or drip edge. The exterior portion 120 of the structural member is shown exposed on the top surface of the membrane. Insulated electrical conductors 130 are shown running parallel within each membrane. In this embodiment, membranes 152, 154 and 156 are electrically connected to membrane conductors 145 that run parallel with the roof ridge 143. Electrical wiring 149 extends from the membrane conductors 145 to electrical junction box 147 in attic. Wiring 160 extends this circuit to an electrical circuit inside a building below the roof.

Figure 1E:
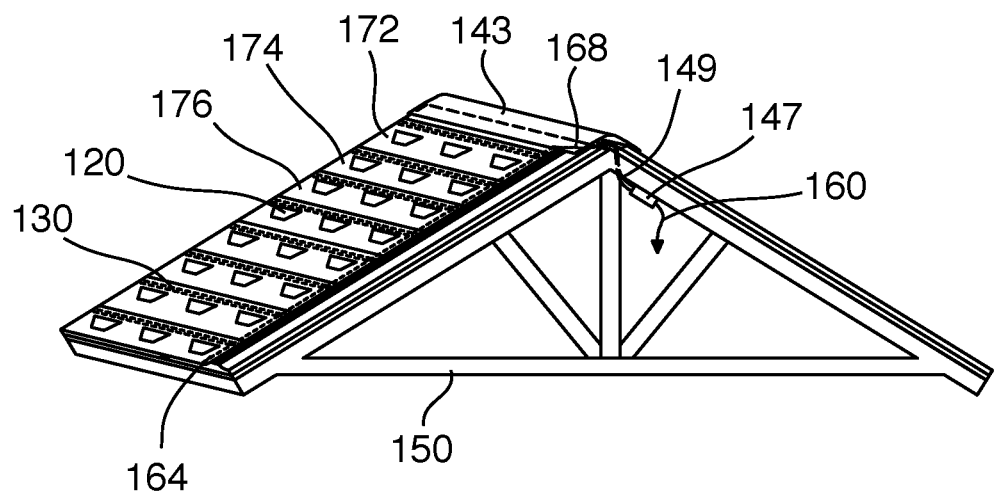
FIG. 1E is an isometric view of a roof with horizontal membranes installed on the surface of a roof.

FIG. 1E is an isometric view of a roof with horizontal membranes installed on the surface of roof 150. Three membranes 152, 154 and 156 are installed on the roof 150 surface as shown. In this embodiment, each of the three membranes 172, 174 and 176 are placed on roof 150 running parallel to the top ridge and parallel to the roof drip edge. The exterior portion 120 of the structural member is shown exposed on the top surface of the membrane. Insulated electrical conductors 130 are shown running parallel within each membrane. In this embodiment, membranes 172, 174 and 176 are electrically connected to membrane conductors 164 that run perpendicular to membranes 172, 174 and 176. Electrical wiring 168 extends from the membrane conductors 164 to electrical junction box 147 in attic. Wiring 160 extends this circuit to an electrical circuit inside a building below the roof.

FIG. 2A is a top view of three membranes connected together. In order to provide support for the installation of solar shingles over an entire roof area, multiple membranes may be placed in multiple rows (either horizontally as shown in FIG. 1E or vertically in FIG. 1D) as needed to cover a larger area. In this embodiment, three parallel membranes 216, 218 and 220 are shown connected together. Overlap area 207 shows how the right edge of membrane 216 overlaps the left edge of membrane 218, for example. Insulated electrical conductors 130 and 132 are shown embedded within each membrane.

In this embodiment, embedded portion 122 along with exterior portion 120 are shown running parallel with each membrane. In certain embodiments, the membrane is semi-flexible and may be rolled-up prior to installation. The membrane may then be un-rolled at the time of installation. In this embodiment, the structural member may run parallel to the direction of the long length of membrane material so that it can be rolled up and un-rolled for installation as required. Each membrane may be adhesively attached to the roof surface in turn. For example, membrane 220 may be installed first and be adhesively attached to a roof surface. After that, membrane 218 may then be adhesively attached to the roof with overlap area 207 of membrane 218 being adhesively attached to membrane 220 forming a seal between the two membranes. Top surface 116 and bottom surface 114 may interface with adjacent membranes if needed.

As shown in this embodiment, membranes 216, 218 and 220 are running vertically with the roof similar to what is illustrated in FIG. 1D. In this example embodiment, each of the membranes 216, 218 and 220 have a center section 205 that is depressed and lower than the main body of the membrane to allow for water flow. This allows for rain water to shed towards this trough area and away from the main surface area of each membrane. This also may encourage debris and dust to be washed down and away from the membrane by rain water. Overlap area 207 is also configured as a trough which is lower than the rest of the membrane.

FIG. 2B is a section view of three membranes connected together. In this embodiment, three membranes 216, 218 and 220 are shown connected together. Overlap area 207 shows how the right edge of membrane 216 overlaps the left edge of membrane 218, for example. Insulated electrical conductors 130 and 132 are shown embedded within each membrane. Raised area 140 is also shown. Embedded portion 122 along with exterior portion 120 are shown In this embodiment, membrane 220 may be installed first and be adhesively attached to a roof surface. After that, membrane 218 may then be adhesively attached to the roof with overlap area 207 of membrane 218 being adhesively attached to membrane 220 forming a seal between the two membranes. Top surface 116 and bottom surface 114 may interface with adjacent membranes. Each of the membranes 216, 218 and 220 may have a center section 205 that is depressed and lower than the main body of the membrane to allow for water flow. Overlap area 207 is also configured as a trough which is lower than the rest of the membrane.

Figure 3:
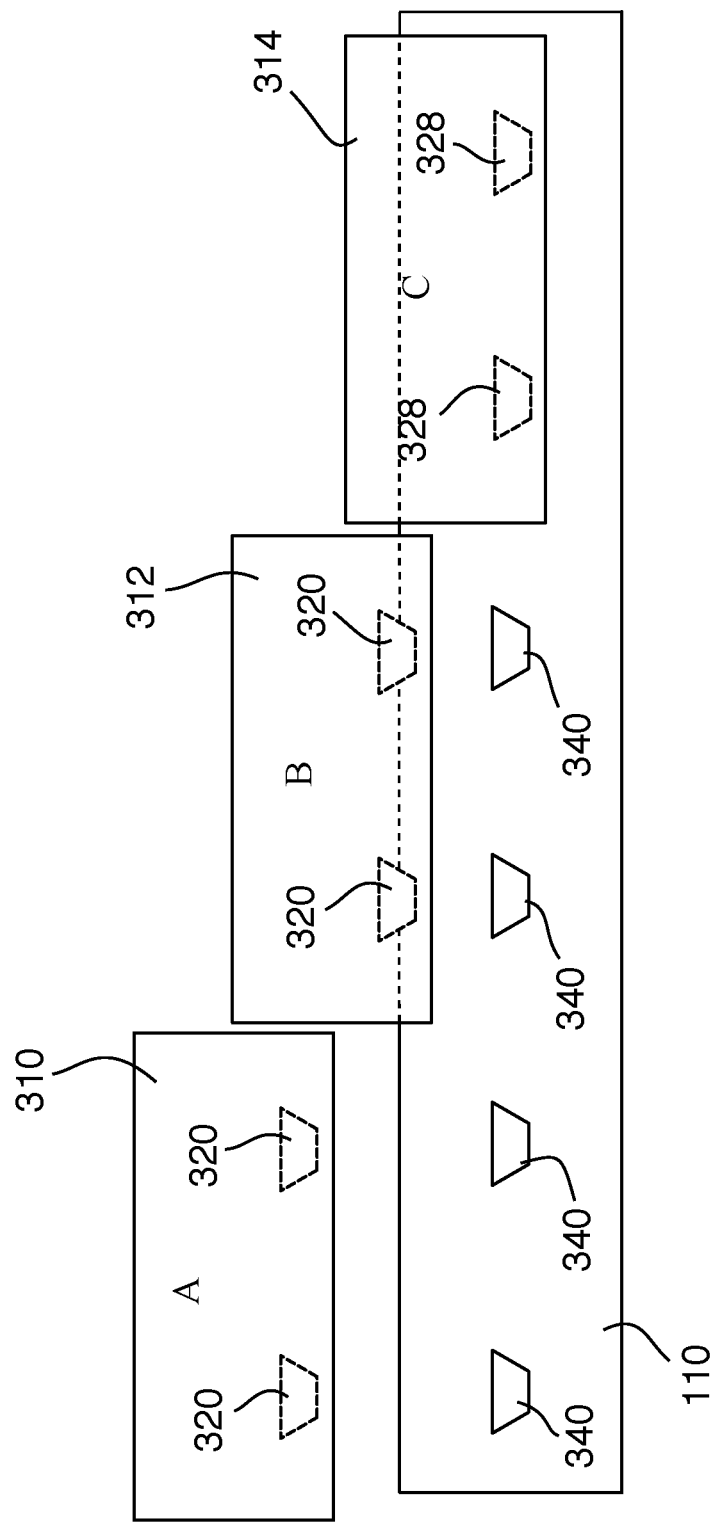
FIG. 3 is an illustration of a membrane with three shingles being installed in order.

FIG. 3 is an illustration of a membrane with three shingles being installed in order. Membrane 110 is shown with structural loops 340 ready to receive the insertion of shingles 310, 312 and 314. Shingle 310 and 312 are demonstrating how they are approaching membrane 110 during installation. Mechanical connection clasps 320 are ready to engage with loops 340 as they are approaching connection. Loops 340 are wedge shaped to allow clasps 320 to align with the insertion point as needed. Shingle 314 is fully inserted and the clasps 328 are fully engaged with the loops. Clasps 328 may have a mechanism that locks shingle 314 into place once fully inserted. Clasp 328 may also have a mechanical release that allows for shingle 314 to be removed if needed in the future. In some cases, one or more shingles may receive damage or otherwise may need to be replaced. A releasing mechanism may allow a shingle to be removed and replaced with a new shingle. In other embodiments, a clasping and release mechanism may reside on the structural loop 340 allowing shingles to be connected. In this example, a loop or similar structural component may be located on the shingle allowing connection to a clasp on the membrane structure.

Figure 4:
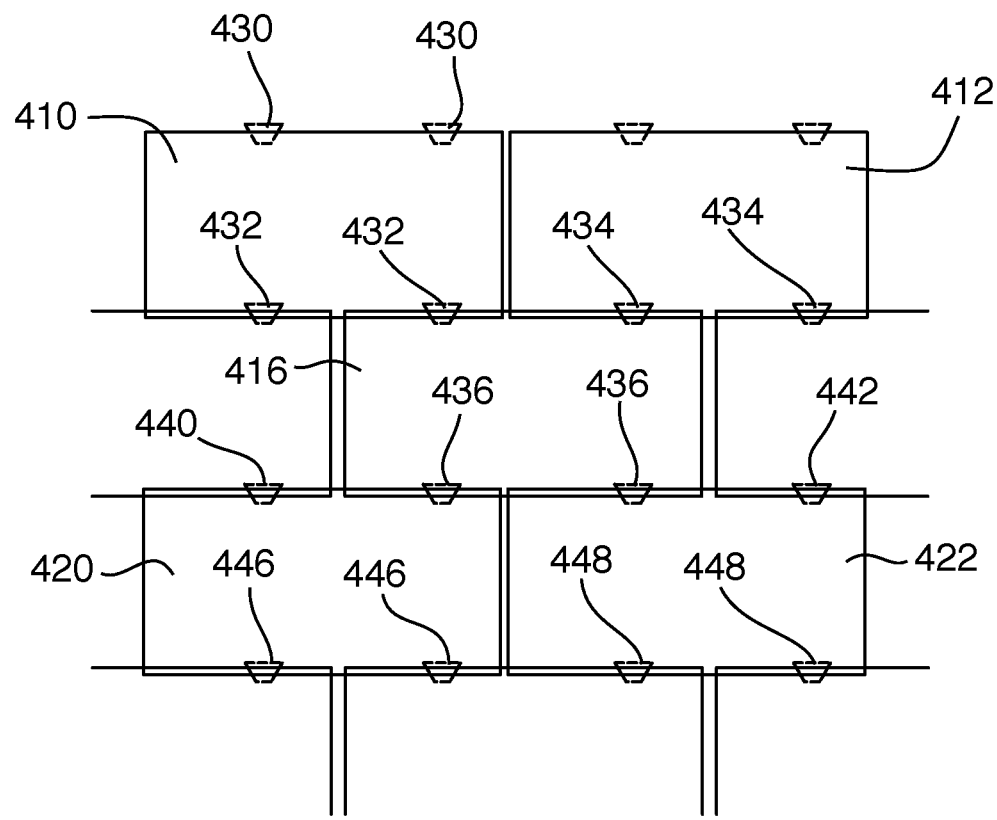
FIG. 4 is an illustration of several shingles connected together on top of a membrane.

FIG. 4 is an illustration of several shingles connected together on top of a membrane. Shingle 410 is mechanically connected to structural loops 430 at the top and structural loops 432 at the bottom of the shingle 410. Shingle 412 is connected with structural loops 434 at the bottom of shingle 412. Structural loop 432 and loop 434 also connect to shingle 416. In this way, each structural loop may engage with more than one shingle. Each shingle may have a mechanical clasp that allows more than one shingle to attach to a single loop. Adjacent shingles may also overlap with structural loops holding them in the proper overlapping position as required. Shingle 416 shares connections 436 with shingles 420 and 422. Shingle 420 has shared connections to loop 440, loop 436 and loops 446. Shingle 422 has shared connections with loop 436, loop 442 and loops 448.

Figure 5:
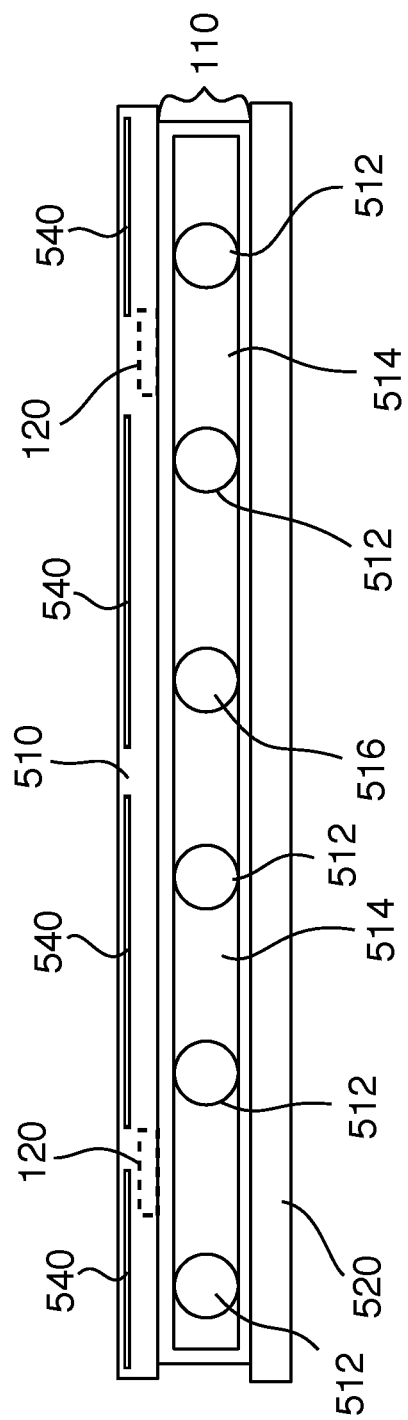
FIG. 5 is a section view of a membrane on a roof surface with a shingle on top of the membrane.

FIG. 5 is a section view of a membrane on a roof surface with a shingle on top of the membrane. Membrane 110 has piping embedded inside the membrane to allow for air flow through the membrane. This airflow keeps the shingles cool by allowing fresh air to be drawn in from the lower edge of the membrane and commuted upwards towards the ridgeline where the hot air may be vented out of vents along the ridgeline. Pipes 512 are inside the membrane 110 as shown. Airflow may enter the inside space 516 of the piping as required. Air may also enter the space 514 between piping 512.

In certain embodiments, solar cells 540 may be embedded in electrical shingle 510. Electrical shingle 510 may be a solar shingle in an embodiment. Airflow below the solar shingle may enhance the performance of the solar cells by keeping the backside of the solar cells 540 cooler. Structural loop exterior portions 120 are also shown which secure the shingle 510 to the membrane 110. Membrane 110 is structurally connected to roof structure 520. The membrane 110 may be adhesively attached to the roof surface. In other embodiments, the membrane may be structurally attached by other connection systems such as screws, clips, clasps, tracks, grooves or other structural means.

Figure 6:
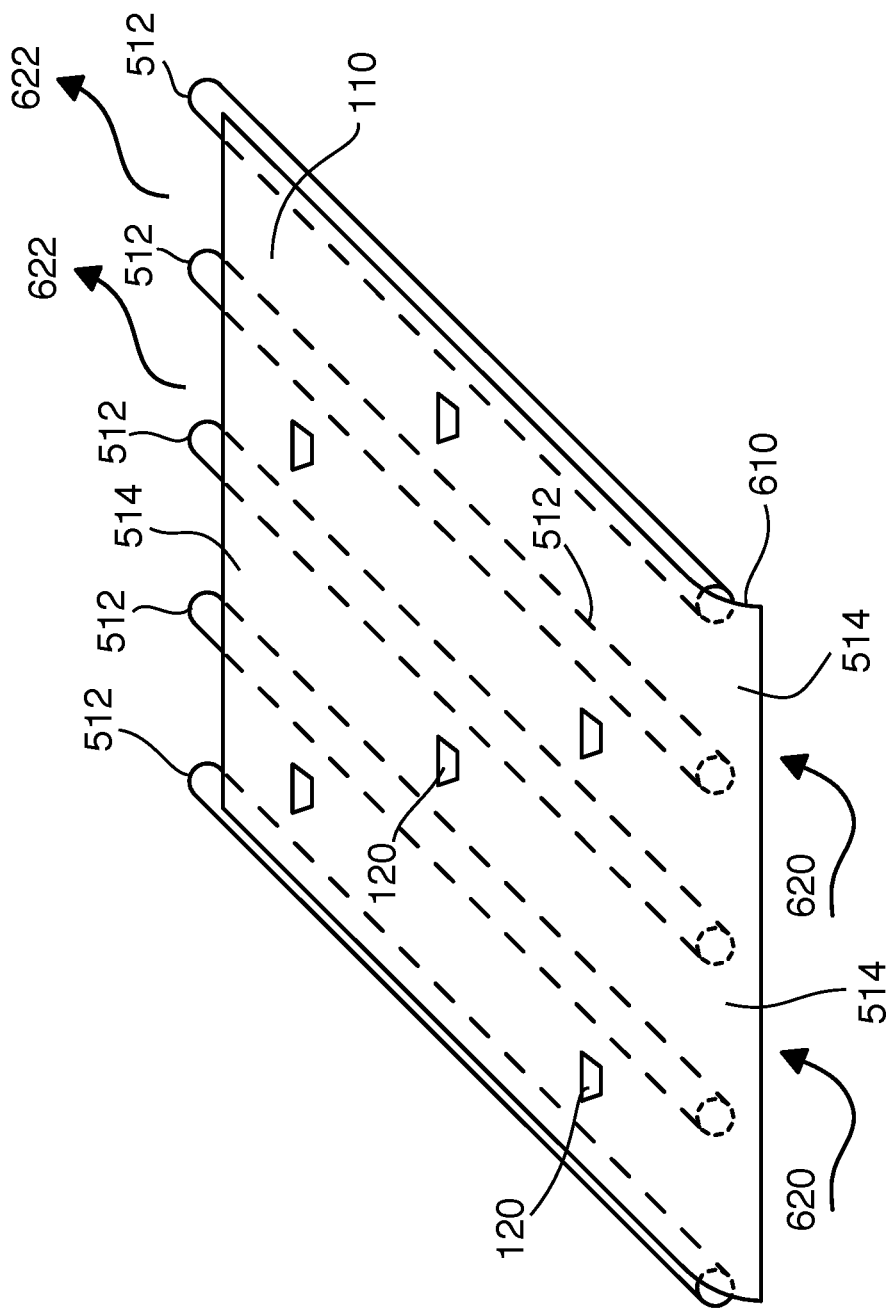
FIG. 6 is an isometric view of a membrane with piping.

FIG. 6 is an isometric view of a membrane with piping. Pipes 512 run from the lower edge of the membrane 110 near the drip edge of a roof up towards the ridgeline of the roof. Airflow 620 enters the lower end of piping 512 at the bottom opening of the pipes 512 and the air is transmitted by natural heat convection up and out the top opening of piping 512. Heated air 622 is vented out of the piping 512, and space 514 between the piping 512 to the outside air via venting along the upper ridgeline of a roof. Structural loop exterior portions 120 are also shown.

In some cases, wind may create an uplift at the lower edge of membrane 110, causing uplift and potentially causing damage to the membrane 110 or even possibly removing the entire membrane (or sections of it) from the roof. To prevent this uplift, the top layer of the membrane 110 may be configured with a shielding 610 at the lower edge of membrane 110 near the rain gutter and drip edge. In this way, the open ends of the piping 512 along with the space 514 between piping 512 may be protected from direct air flow from the wind. The shielding may be configured to either redirect the airflow or disturb and dissipate the energy of the airflow to reduce the velocity of the flow into the space under the shingles.

Figure 7:
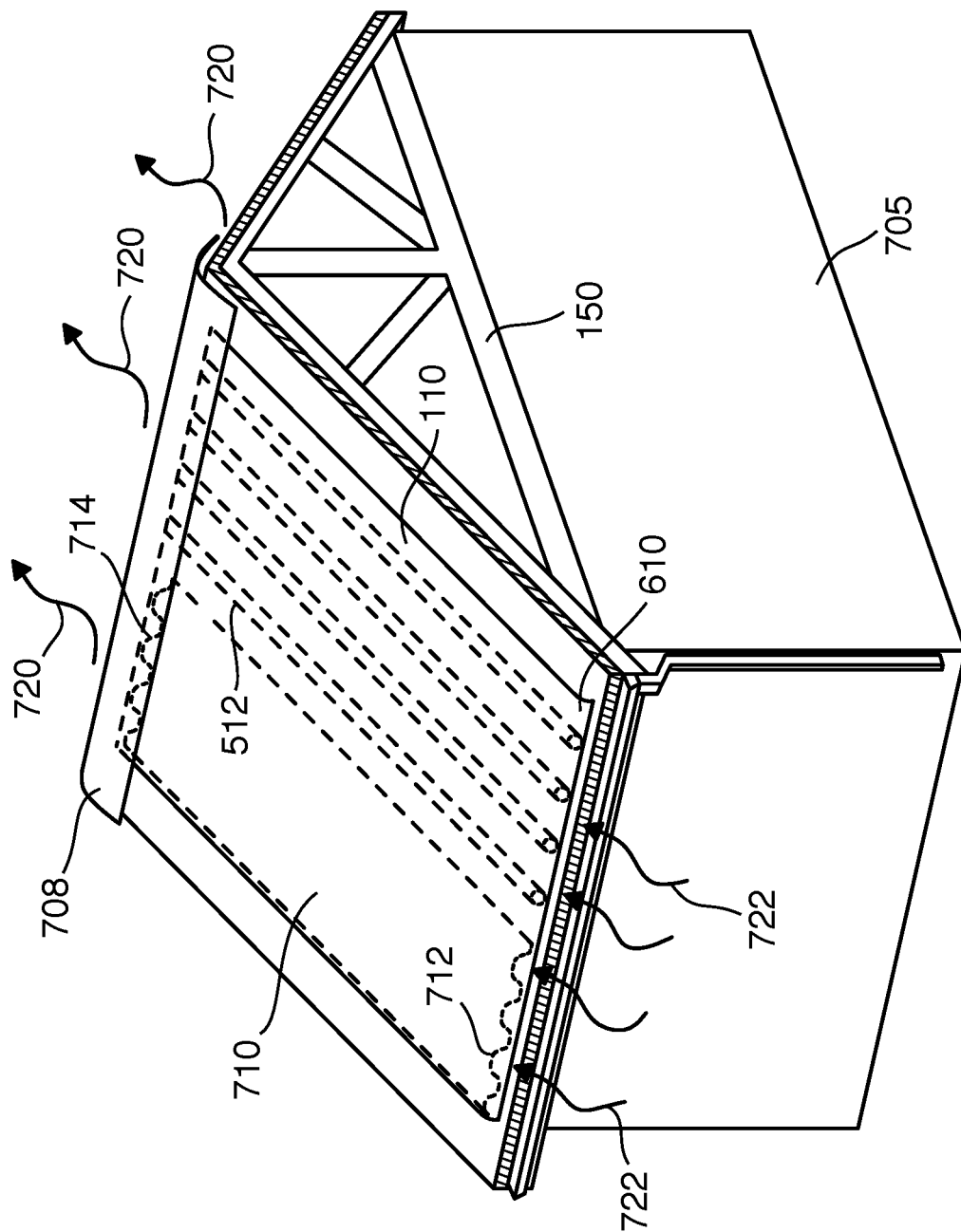
FIG. 7 is an isometric view of a building with the air flow version of the membrane installed on a roof.

FIG. 7 is an isometric view of a building 705 with the air flow version of the membrane installed on the roof 150. Cool air 722 is drawn in at the lower edge of membrane 110 and drawn up through the piping 512 to the top ridge 708 and the now heated air 720 is vented out through venting along the ridgeline 708. Wind shielding 610 is also shown. A corrugated airflow membrane (CAM) 710 is also shown. The shape of the CAM 710 also creates channels for the airflow to transmit up from the bottom edge 712 of the CAM 710, up through the membrane 710 and to the top edge 714 at the ridgeline 708 venting above.

Figure 8:
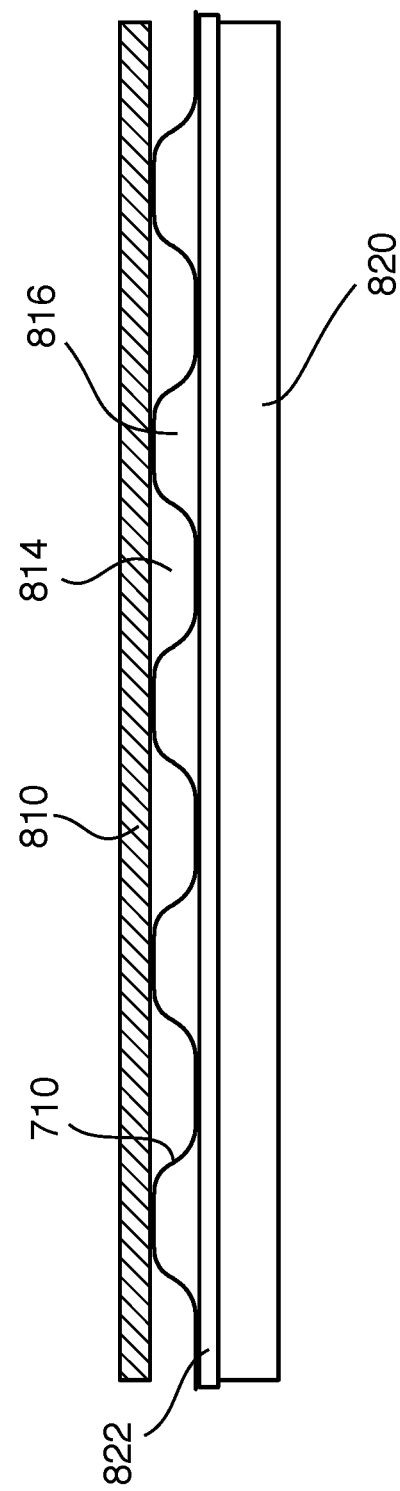
FIG. 8 is a section view of the corrugated airflow membrane (CAM).

FIG. 8 is a section view of the corrugated airflow membrane (CAM). CAM 710 is shown with shingle 810 mounted to the top of the CAM 710. The CAM 710 is also structurally attached to roof sheeting 822 which is in turn structurally attached to roof structure 820. Air gap 814 is shown below the shingle 810 and air gap 816 is shown between CAM 710 and roof sheeting 822.

FIG. 9A is an isometric view of the CAM 710. Structural loop exterior portions 120 are also shown. In this embodiment, the membrane itself is structured in a corrugated shape in order to allow for airflow above and below each section of the CAM 710.

FIG. 9B is a section view of the CAM 710 showing Structural loop exterior portions 120 along with embedded sections 122 of the structural member. shingles 910 are also shown. In this example embodiment, insulated electrical conductors 920 are conformally attached to the bottom surface of the CAM 710.

FIG. 9C is a section view of a second embodiment of the CAM 710 showing Structural loop exterior portions 120 along with embedded sections 122 of the structural member. Shingles 910 are also shown. In this example embodiment, insulated electrical conductors 922 are embedded inside of the CAM 710.

Figure 10A:
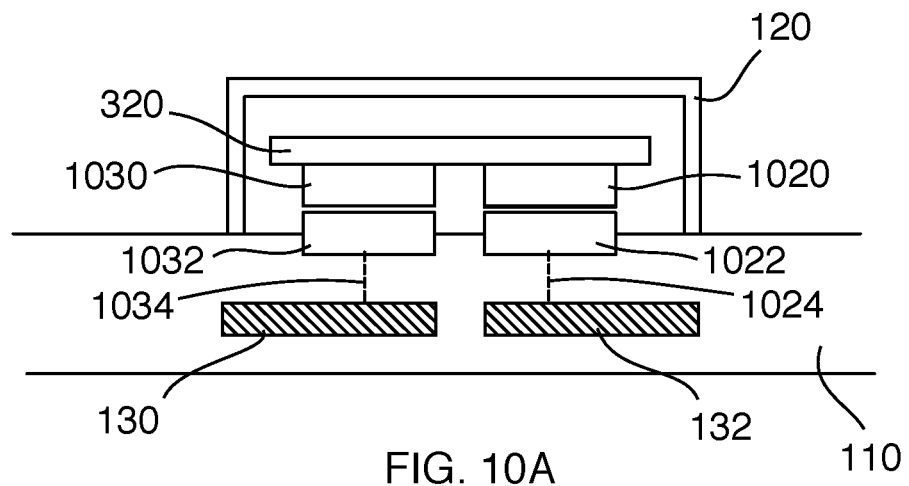
FIG. 10A is a section view of the structural loop exterior portion with clasping mechanism and electrical contacts.

FIG. 10A is a section view of the structural loop exterior portion 120 with clasping mechanism and electrical contacts. In this embodiment, the electrical contacts 1020 and 1030 are embedded in the clasping mechanism 320 of a shingle. Electrical connections are made between shingle contact 1030 and membrane contact 1032. Likewise, shingle contact 1020 makes an electrical connection with membrane contact 1022. Electrical wire 1034 connects membrane contact 1032 to insulated electrical conductor 130. Electrical wire 1024 connects membrane contact 1022 to insulated electrical conductor 132. This embodiment demonstrates how the electrical connections may be incorporated within the clasping mechanism. The electrical connections may also be within the structural loop.

Figure 10B:
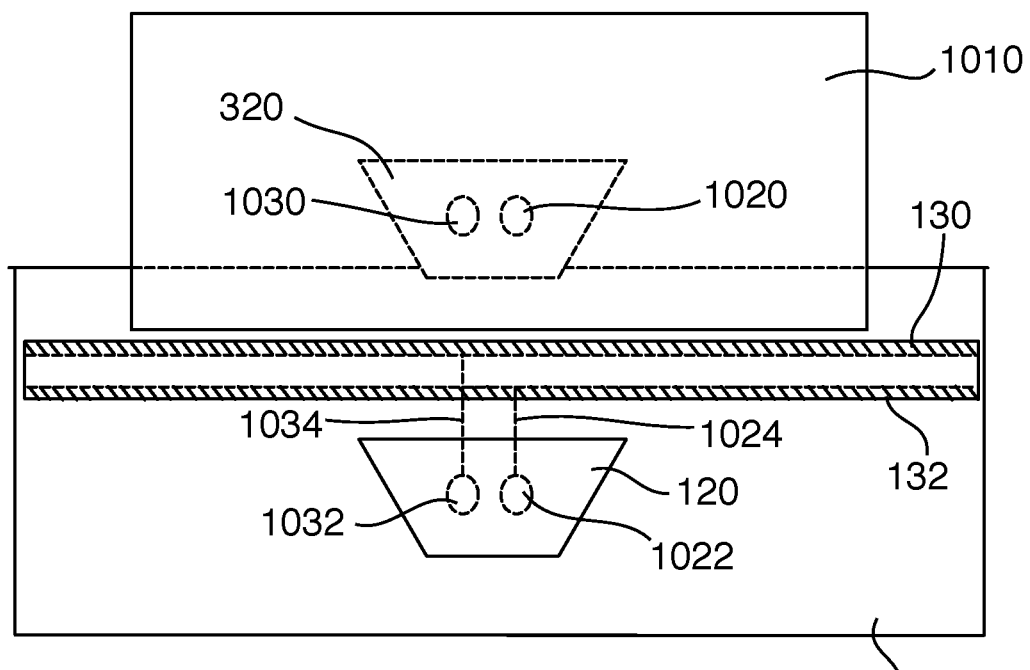
FIG. 10B is an overhead view of a shingle aligning with a membrane.

FIG. 10B is an overhead view of a shingle 1010 aligning with membrane 110. The structural loop exterior portion 120 is shown on top of membrane 110. In this embodiment, the electrical contacts 1020 and 1030 are embedded in the clasping mechanism 320 of a shingle.

Shingle contact 1030 aligns with membrane contact 1032. Likewise, shingle contact 1020 aligns with membrane contact 1022. Electrical wire 1034 connects membrane contact 1032 to insulated electrical conductor 130. Electrical wire 1024 connects membrane contact 1022 to insulated electrical conductor 132.

Figure 11A:
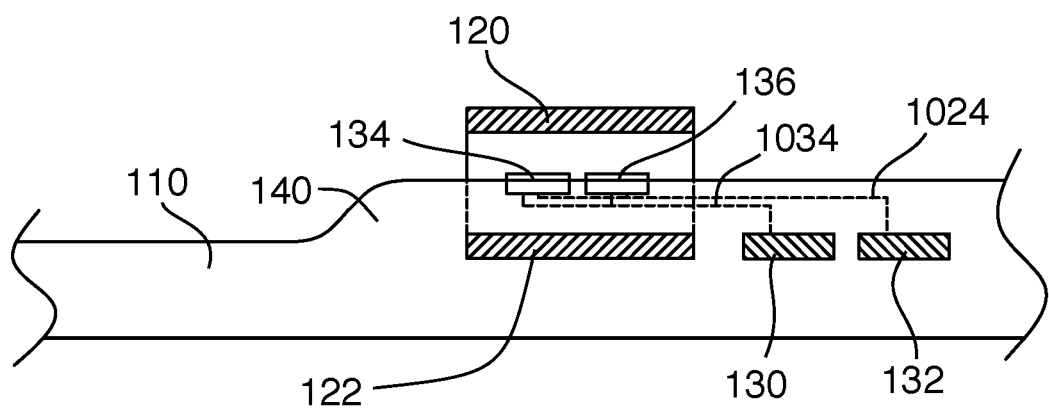
FIG. 11A is a cross section view of membrane.

FIG. 11A is a cross section view of membrane 110. The structural loop exterior portion 120 and embedded portion 122 is shown. In this embodiment, the membrane contacts 134 and 136 are embedded in the membrane 110 below exterior portion 120 of shingle 110. Electrical wire 1034 connects membrane contact 1032 to insulated electrical conductor 130. Electrical wire 1024 connects membrane contact 1022 to insulated electrical conductor 132. Raised area 140 is at a higher level than the rest of the membrane providing a "high point" for water and other material from entering the electrical connection point of the connector. The raised area 140 sheds water away from the contacts 134 and 136.

Figure 11B:
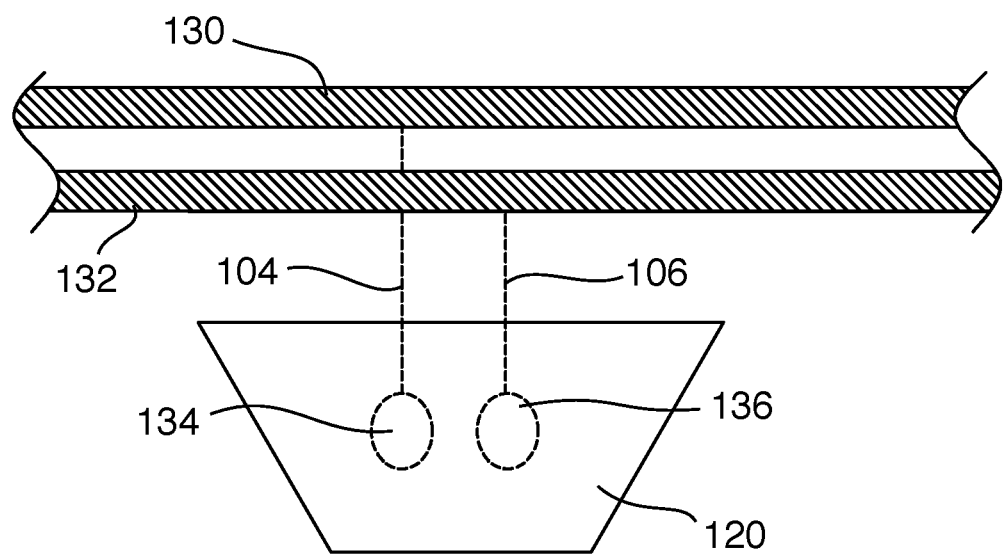
FIG. 11B is an overhead view of a mechanical/electrical connector with connections to the embedded electrical conductor.

FIG. 11B is an overhead view of a mechanical/electrical connector with connections to the embedded electrical conductor. Electrical contacts 134 and 136 are shown below exterior portion 120. Embedded electrical conductors 130 and 132 are electrically connected to connector electrical contacts 134 and 136 via interconnecting wiring 104 and 106.

Figure 12A:
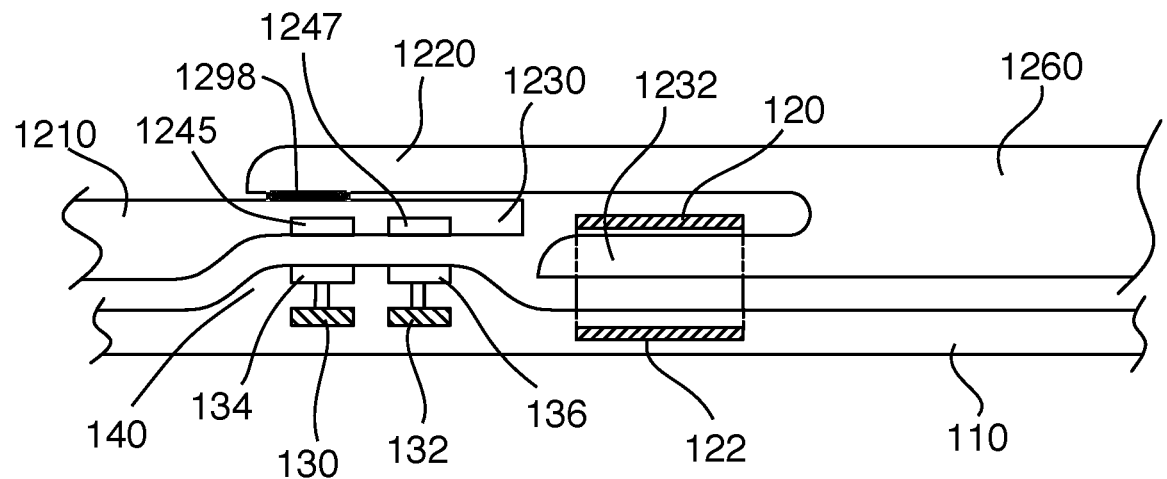
FIG. 12A is a side section view of mechanical/electrical connector inside a membrane with solar shingles connected to the membrane.

FIG. 12A is a side section view of mechanical/electrical connector inside a membrane with solar shingles connected to the membrane. First Shingle 1210 has electrical contacts 1245 and 1247 embedded along the edge of the first shingle 1210. Contacts 1245 and 1247 electrically connect to membrane contacts 134 and 136. Contacts 134 and 136 are electrically connected to electrical conductors 130 and 132 as shown. Second shingle 1260 is mechanically attached to membrane 110 via mechanical exterior portion 120. Bottom lip 1232 of second shingle 1260 mechanically holds the second shingle 1260 in place by sliding in under exterior portion 120. Upper lip 1220 of second shingle 1210 overlaps top section 1230 of first shingle 1210 allowing water to run off and not enter the connection area below. Waterproof seal 1298 may also be provided, preventing water from entering the electrical connection below. Embedded portion 122 is also shown. Raised area 140 as shown in this example is raised and at a level higher than both attached shingles. Embedded electrical conductors 130 and 132 are electrically connected to connector electrical contacts 134 and 136.

Figure 12B:
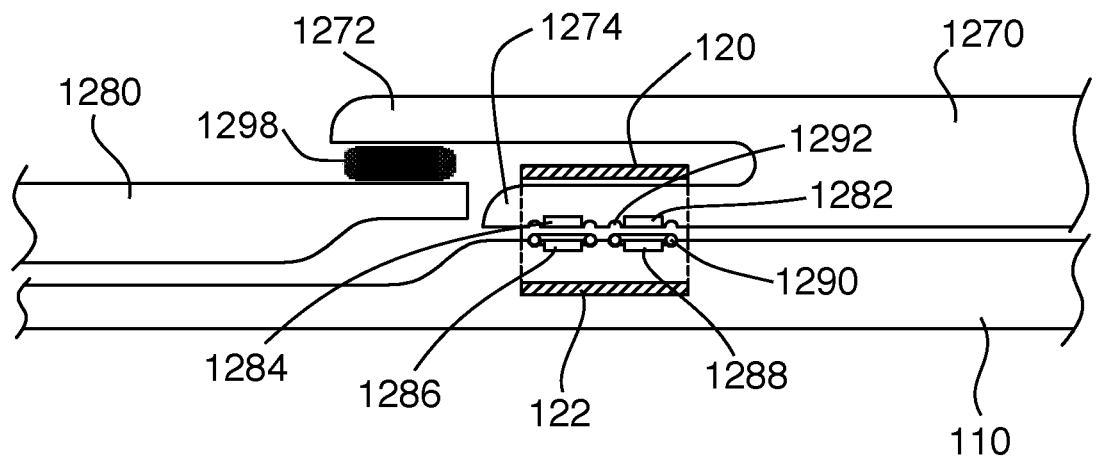
FIG. 12B is a side section view of another embodiment of a mechanical/electrical connector.

FIG. 12B is a side section view of another embodiment of a mechanical/electrical connector. In this example, first shingle 1280 sits on top of membrane 110. Second shingle 1270 has an overlap section 1272 that lays on top of first shingle 1280 providing both mechanical support to hold first shingle 1280 in place and also provides a waterproof seal 1298 preventing water from entering the electrical connection below. Second shingle 1270 is mechanically attached to membrane 110 via lower lip 1274 inserted into mechanical exterior portion 120. Electrical contacts 1282 and 1284 are embedded in second shingle 1270 and electrically connect to membrane contacts 1286 and 1288. Waterproof seal 1290 may also be provided to prevent water penetration into the electrical connection area. Watertight seal gasket allowance features 1292 may also be provided to allow for a tight connection of the waterproof seal 1290 between the second shingle 1270 and the membrane 120. Embedded portion 122 is also shown.

Figure 13A:
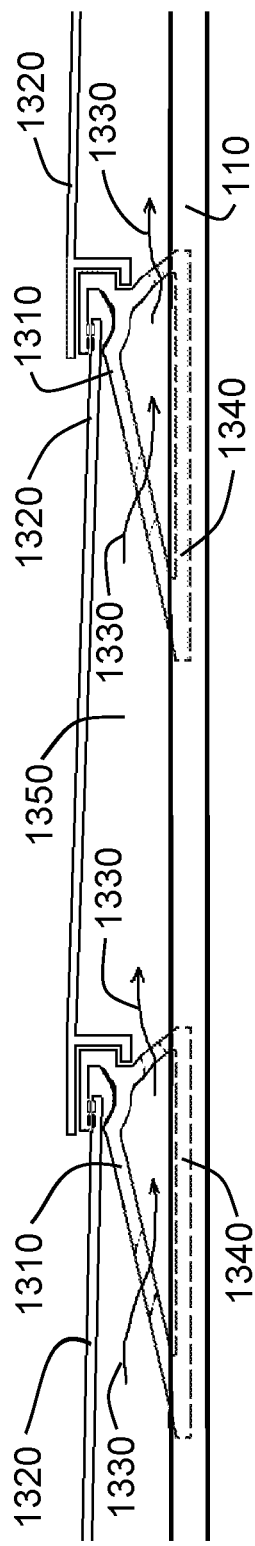
FIG. 13A is a side view section of multiple solar shingles attached to the membrane with an air gap between the shingles and the membrane.

FIG. 13A is a side view section of multiple solar shingles attached to the membrane with an air gap between the shingles and the membrane. Shingles 1320 are held in place by mechanical/electrical connectors 1310. Air flow 1330 is shown passing through each connector 1310 and between the air gap 1350 between the shingles 1320 and the membrane 110. Embedded portion 1340 of connector 1310 is also shown.

Figure 13C:
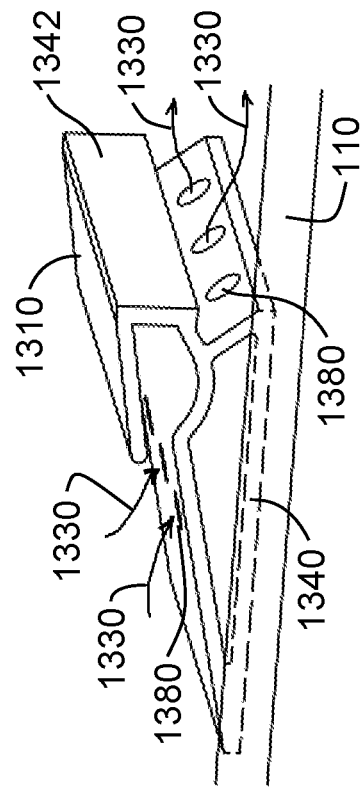
FIG. 13C is a perspective drawing of a mechanical/electrical connector.
Figure 13B:
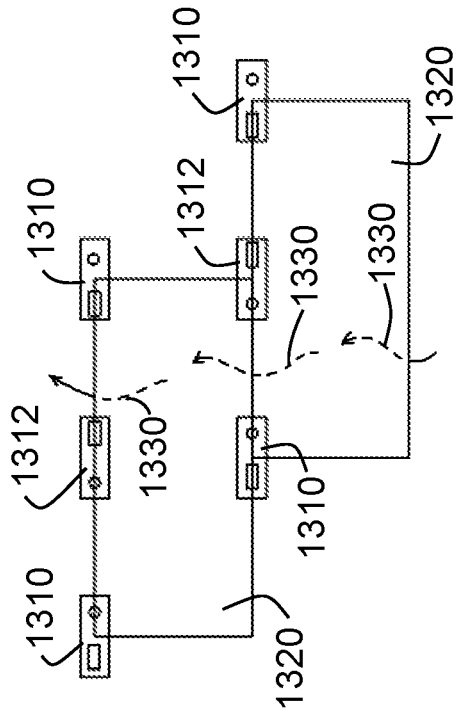
FIG. 13B is an overhead view of two shingles with connectors.

FIG. 13B is an overhead view of two shingles with connectors. Connectors 1310 are shown at the exterior corners of shingles 1320. Middle connectors 1312 are shown which provide additional mechanical and electrical redundancy in case of any failure to the connectors 1310. Air flow 1330 is shown passing under the solar shingles 1320. Air flow below the shingles allows the shingles to perform at their highest efficiency. It is known that the cooler the back of the shingles, the more efficient the power output of the shingles.

FIG. 13C is a perspective drawing of a mechanical/electrical connector. Membrane 110 is shown with mechanical/electrical connector 1310, exterior portion 1342 and embedded portion 1340. Air holes 1380 may be provided in the connector 1310 to allow air flow 1330 through the connector 1310.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A roofing underlayment providing mechanical and electrical connection for solar shingles comprising:
    a water-impervious membrane adapted to be attached to a roof by adhesive;
        a mechanical attachment member running substantially the length of the membrane and have multiple alternating embedded portions within the membrane and extending portions extending above the membrane, wherein the extending portions each are mechanically configured for attaching a solar shingle to the roof;
        an electrical conductor running substantially the length of the membrane and having at least a first embedded portion embedded within the membrane, having multiple connecting portions extending above the membrane configured to electrically connect to each of the solar shingles, and having a third portion configured to plug in and electrically connect to an electrical circuit;
        wherein the connection portions are electrical extending portions and are positioned and configured so that solar shingles are mechanically attached and electrically connected simultaneously and without creating holes through the membrane; and
        an air gap that allows for air flow below the solar shingles, wherein the air gap comprises a space between a bottom surface of the solar shingles and a top surface of the membrane.

2. The invention of claim 1, wherein the membrane has a corrugated shape creating the air gap.

3. The invention of claim 1, wherein the air gap comprises channels that run from one side of the membrane to an opposite side.

4. The invention of claim 1, wherein the channels comprise pipes.

5. The invention of claim 1, wherein the mechanical attachment members hold the shingles a distance above a top surface of the membrane, thus creating the air gap.

6. The invention of claim 1 further comprising at least a second mechanical attachment member of similar construction and running parallel to the mechanical attachment member and at least a second electrical conductor of similar construction and running parallel to the electrical conductor.

7. The invention of claim 1 wherein the multiple portions extending above the membrane are mechanically configured for receiving attachment members on multiple solar shingles.

8. The invention of claim 1 wherein the membrane is adapted to be attached to a roof by adhesive.

* * * * *